April 21, 1925. 1,534,940
W. GANNON
STARTING HANDLE FOR INTERNAL COMBUSTION ENGINES
Filed July 21, 1924
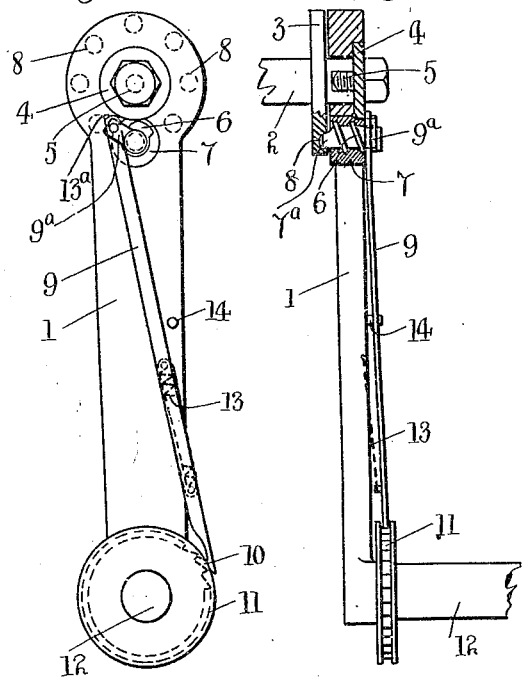
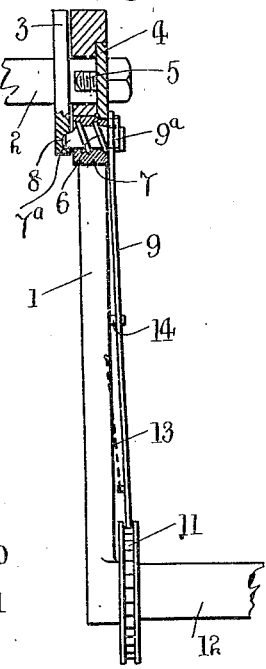
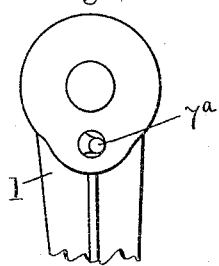
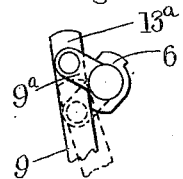
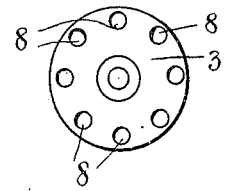
Inventor
Wilfred Gannon
by Ernest Wilkinson
Attorney.

Patented Apr. 21, 1925.

1,534,940

UNITED STATES PATENT OFFICE.

WILFRED GANNON, OF LONDON, ENGLAND, ASSIGNOR TO WILFRED RICHARD TIDMARSH, OF LONDON, ENGLAND.

STARTING HANDLE FOR INTERNAL-COMBUSTION ENGINES.

Application filed July 21, 1924. Serial No. 727,312.

*To all whom it may concern:*

Be it known that I, WILFRED GANNON, a subject of the King of Great Britain, residing at London, England, have invented certain new and useful Improvements in Starting Handles for Internal-Combustion Engines, of which the following is a specification.

This invention relates to improvements in starting cranks or handles for internal combustion engines.

An object of the present invention is to eliminate the personal risk from a back fire when starting up the engine by hand.

To this end the present invention broadly consists of a starting crank comprising a one-way acting component on the handle-grip, a clutch component on the crank boss for engaging the crank shaft, and a connector interposed between the one-way acting component and the clutch component, the parts being so arranged that on a planetary movement of the grip in relation to the crank in a direction for starting the engine, the clutch component engages the crank shaft, but on a back-fire the one-way acting device engages the connector to automatically disengage the clutch component from the crank shaft.

The accompanying drawings shew by way of example one form of carrying out the present invention.

Fig. 1 is a front view of the device, Fig. 2 a face view of the crank boss, Fig. 3 is a face view of a disc on the crank shaft with which the clutch component co-operates, Fig. 4 is a detail view of the connector arm and screw, and Fig. 5 is a side view of Fig. 1.

The crank 1 is freely mounted on the crank shaft 2 between a disc 3 and a washer 4 secured to the end of the shaft by a screw 5. The other end of the shaft 2 carries a suitable clutch device for engaging with the engine shaft. A screw 6 with a quick-pitch square thread, operating in a nut 7 embedded in the crank or lever, passes through the lever.

The screw 6 at one end is formed as a bevelled pin $7^a$ which pin engages in one of a series of grooves or holes 8 in the face of the disc 3. One end of a bar connector 9 is pivoted to an arm $9^a$ carried by the screw 6. The other end of the bar 9 has a pawl 10 engaging a flanged ratchet wheel 11 incorporated with the handle grip 12.

A spring 13 is connected to the bar 9 and to the crank 1 to keep the pawl in engagement with the ratchet wheel 11. This spring serves also to ensure automatic engagement of the pin $7^a$ in the holes 8. The bar 9 has an extension $13^a$ acting as a stop to limit the turn of the screw to the amount required to give clearance from the disc 3. The pawl 10 is prevented from leaving the ratchet wheel by a stop 14 on the lever, placed in such a position to allow the pawl 10 to mount the teeth of the ratchet wheel 11, but preventing the pawl from passing the flanges of the ratchet wheel.

When the crank handle 1 is moved clockwise to start the engine the planetary motion of the handle grip 12, in relation to the crank shaft 2 allows the pawl 10 to pass over the teeth of the ratchet wheel 11. In the event of the engine back-firing the reverse movement enables the ratchet wheel 11 to engage the pawl 10 thus causing the screw 6 to withdraw the pin $7^a$ from engagement with the disc.

What I claim is:—

A starting handle for internal combustion engines, comprising a crank adapted to be freely mounted at one end on a crank shaft, a disc fixed to the crank shaft at one side of the crank and having a circular row of depressions in one side opposite the crank, a threaded pin mounted in the crank and adapted to seat at its inner end in said depressions one at a time, a radial arm carried on the other end of the pin, a connecting rod pivoted to the outer end of the radial arm and extending toward the other end of the crank, a handle rotatably mounted on the other end of the crank, a ratchet wheel carried by the handle, a ratchet mounted on the outer end of said rod to engage the ratchet wheel, and a spring connected between said rod and the crank for normally urging the rod to move in a direction to lock said pin in the adjacent depression in said disc, the backward turning of said handle being adapted to interlock the ratchet wheel and ratchet and draw said rod against the spring to release the pin.

In testimony whereof, I affix my signature.

WILFRED GANNON.